E. H. DUNBAR.
SHOE MEASURING DEVICE.
APPLICATION FILED NOV. 12, 1914.

1,161,765.

Patented Nov. 23, 1915.

WITNESSES:
John Buckler,
James J. Coogan

INVENTOR:
Everett H. Dunbar
by Franklin V. Phillips Jr
Attorney

UNITED STATES PATENT OFFICE.

EVERETT H. DUNBAR, OF LYNN, MASSACHUSETTS.

SHOE-MEASURING DEVICE.

1,161,765. Specification of Letters Patent. Patented Nov. 23, 1915.

Application filed November 12, 1914. Serial No. 871,713.

*To all whom it may concern:*

Be it known that I, EVERETT H. DUNBAR, a citizen of the United States, residing at Lynn, in the county of Essex and Commonwealth of Massachusetts, have invented a new and useful Improvement in Shoe-Measuring Devices, of which the following is a specification.

My invention relates to a device for the measurement of shoes and it has been the special object of my invention to provide a device to be inserted in the inside of a shoe and to there measure its size accurately in respect to length in order to determine the size of last upon which it was constructed.

It has also been a further object of my invention to provide an attachment for my device which will make it possible to ascertain to what extent, in respect to its length, a shoe may afford accommodation for the foot of a wearer.

My invention may be best understood by reference to the accompanying drawing in which—

Figure 1:
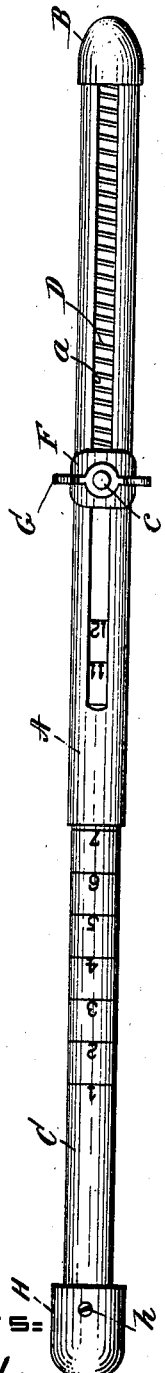
Figure 2:
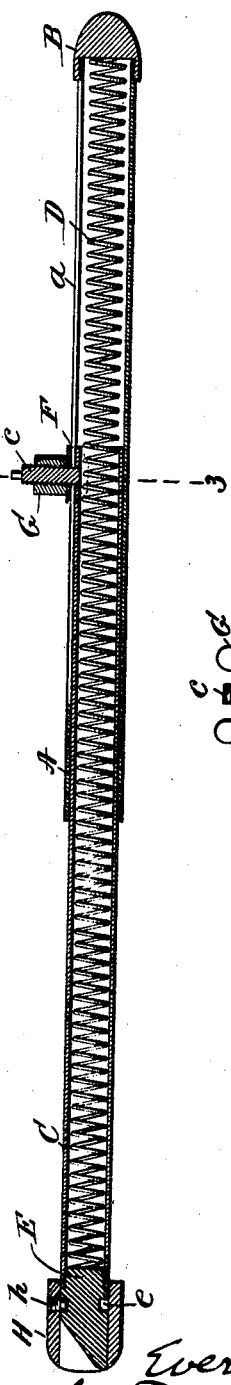
Figure 3:
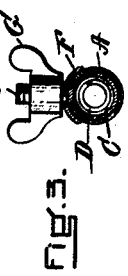

Figure 1 is a top view. Fig. 2 is a longitudinal section. Fig. 3 is a cross section on line 3—3 of Fig. 2.

Referring now more particularly to the drawing A is a hollow metal sleeve provided with a slot $a$. A rounded cap B is screwed upon the threaded end of the sleeve. A hollow metal rod C is slidably mounted within the sleeve A and normally pressed outward by the coil spring D which butts at one end against the cap B and at the other end against the back of the tip E which is screwed into the threaded interior of the outer end of the rod C. A threaded post $c$ mounted on the rod C extends upwardly through slot $a$ of the sleeve A and passes through a washer F which is curved to fit the rounded exterior of sleeve A. A wing nut G mounted on the threaded post $c$ may be screwed down against the washer F so as to hold the rod C in any desired position of adjustment in respect to the sleeve A.

An attachment H in the form of a short sleeve with a rounded extremity may be placed upon the tip E and secured thereon by means of the screw $h$ which enters the slot $e$ in the tip E. It will be noted in Fig. 2 that the extremity of the tip E slants backward from its base and, when the attachment H is mounted thereon, the tip E extends to the outer extremity of the attachment.

It will be noted that a measurement scale 1, 2, 3, etc., appears upon the top of rod C as shown in Fig. 1. The method of placement of this scale is as follows: The rod C is pressed into the sleeve A until the length of the whole apparatus is that indicated by size 1 on a standard scale such as that given by the so-called "U. S. standard last measure stick" or "20th century short measure." A scale mark is then placed on rod C opposite the edge of the inner end of sleeve A and the rod C is extended as far as the slot $a$ will permit and further graduation marks are placed thereon at intervals determined by the particular scale of measurement which is employed. If desired it is obvious that a plurality of different scales commonly employed in shoe measurement may be placed upon my device in the manner indicated. When the graduation marks have been properly placed in the manner above described it is apparent that the reading afforded by reference to the relation of the inner end of the sleeve A to the scale upon rod C will indicate the last-size, in respect to length, represented by the length of my whole device.

The method of operating my device is as follows: If it is desired to measure the whole inside length of a shoe the attachment H is removed and the rod C is pressed backward into the sleeve A until the length of the whole apparatus is considerably less than that of the shoe to be measured and the wing nut G is preferably turned so as to hold these parts in a fixed position. A device is then inserted into the shoe, the wing nut being maintained uppermost, and then the wing nut is turned so as to release the parts which have been held thereby and permit the spring D to move the rod C outward until the tip E has become inserted into the toe of the shoe as far as possible while the cap B is bearing upon the inside of the back of the shoe. The wing nut G is again screwed down so as to bind the rod C and the sleeve A together and the device is removed from the shoe. The position of the inner end of the sleeve A with reference to the scale on rod C will then indicate the size of the last, in respect to length, upon which the shoe has been made. Thus one may readily ascertain the size of a shoe upon which the size mark has been obliterated or can ascertain upon what scale of measurement a shoe has been marked in the event that the mark appears thereon without reference to the scale employed, as is commonly the case.

If it is desired to determine the amount of space available in the front part or toe of the shoe for the foot of the wearer this may be done by placing upon the tip E an attachment H which may vary in thickness but which will be selected with regard to the approximate size of the great toe of the person to be fitted. When the device is then inserted in a shoe after the manner hereinabove described the rod C will be forced forward only as far as there is space in the front of the shoe for the attachment H to enter. The measurement thereby afforded, when compared with the foot of the person to be fitted with a pair of shoes, will be of assistance in determining the size of shoe which he should wear.

Having thus fully described my invention what I claim is—

1. In a measuring device adapted to be inserted in the interior of a shoe, the combination of a hollow sleeve, a rod slidably mounted in said sleeve, a coil spring contained within said hollow sleeve and adapted normally to press said rod outwardly with respect to said sleeve, there being a slot in said sleeve, a threaded post mounted on said rod and extending through said slot, a washer loosely mounted on said post, and a wing nut mounted on said threaded post and arranged to be screwed down upon said washer so as to bind said rod and sleeve firmly together, said rod being provided with a graduated measuring scale arranged to indicate the length to which the whole device is extended in terms of last measurement when read in reference to its position in respect to said sleeve.

2. In a device of the character described, the combination of extensible measuring means, and a member removably mounted on one end thereof for the purpose specified.

In testimony whereof I have hereunto set my hand in the presence of two subscribing witnesses.

EVERETT H. DUNBAR.

Witnesses:
M. E. O'CONNELL,
FRANKLIN F. PHILLIPS, Jr.